United States Patent
Pan et al.

(10) Patent No.: US 9,846,456 B2
(45) Date of Patent: Dec. 19, 2017

(54) PORTABLE ELECTRONIC DEVICE

(71) Applicant: Quanta Computer Inc., Taoyuan (TW)

(72) Inventors: Pin-Fan Pan, Taoyuan (TW); Chia-Fu Lu, Taoyuan (TW); Yen-Ching Wang, Taoyuan (TW)

(73) Assignee: QUANTA COMPUTER INC., Guishan Dist., Taoyuan (TW)

(*) Notice: Subject to any disclaimer, the term of this patent is extended or adjusted under 35 U.S.C. 154(b) by 0 days.

(21) Appl. No.: 15/091,891

(22) Filed: Apr. 6, 2016

(65) Prior Publication Data
US 2017/0177036 A1   Jun. 22, 2017

(30) Foreign Application Priority Data
Dec. 16, 2015 (TW) ............... 104142216 A (51) Int. Cl.
*G06F 1/16* (2006.01)
(52) U.S. Cl.
CPC ........... *G06F 1/1654* (2013.01); *G06F 1/166* (2013.01); *G06F 1/1669* (2013.01); *G06F 1/1681* (2013.01)
(58) Field of Classification Search
CPC ...... G06F 1/1654; G06F 1/166; G06F 1/1669; G06F 1/1681; G06F 1/1633; G06F 1/203; G06F 3/02; G06F 3/023; H04M 1/02; B41J 5/10

USPC ........... 361/679.26, 679.27, 679.21, 679.01, 361/679.02, 679.55–679.58
See application file for complete search history.

(56) References Cited

U.S. PATENT DOCUMENTS
9,404,298 B1 * 8/2016 Chen ................. G06F 1/1681

FOREIGN PATENT DOCUMENTS
GB   2381774 A * 5/2003 ........... G06F 1/1616
TW   I306561      2/2009

OTHER PUBLICATIONS

Chinese language office action dated Aug. 18, 2016, issued in application No. TW 104142216.

* cited by examiner

*Primary Examiner* — Anthony Haughton
*Assistant Examiner* — Ingrid Wright
(74) *Attorney, Agent, or Firm* — McClure, Qualey & Rodack, LLP (57) ABSTRACT

A portable electronic device includes a display, a sliding track, a hinge, and a host. The display has a receiving groove. The sliding track is disposed in the display, and faces the receiving groove. The hinge is movably disposed on the sliding track, and located in the receiving groove. The host is disposed on the hinge. The host is rotated and moved relative to the display via the hinge. When the portable electronic device is in a tablet mode, the host is located in the receiving groove, and sustainably parallel to the display.

9 Claims, 11 Drawing Sheets

PORTABLE ELECTRONIC DEVICE

CROSS-REFERENCE TO RELATED APPLICATIONS

This Application claims priority of Taiwan Patent Application No. 104142216 filed on Dec. 16, 2015, the entirety of which is incorporated by reference herein.

BACKGROUND OF THE INVENTION

Field of the Invention

The present disclosure relates to a portable electronic device, and in particular to a portable electronic device having various operation modules.

Description of the Related Art

Since tablet computers and touch displays are popular, users are used to operating computers by touch. Therefore, in order to facilitate user operations, some laptop computers provide touch displays and can be changed to tablet computers via transforming mechanisms.

However, although laptop computers having transforming mechanisms have been generally adequate for their intended purposes, they have not been entirely satisfactory in all respects. Consequently, it would be desirable to provide a solution for improving laptop computers.

BRIEF SUMMARY OF THE INVENTION

The present disclosure provides a portable electronic device, which can be easily changed to various operation modules.

The present disclosure provides a portable electronic device including a display, a sliding track, a hinge and a host. The display has a display surface, a display-rear surface opposite to display surface, and a receiving groove formed on the display-rear surface. The sliding track is disposed on display, and faces the receiving groove. The hinge is movably disposed on the sliding track, and located in the receiving groove.

The host is disposed on a hinge, and has an input surface, and a host-rear surface opposite to the input surface. The host is rotated and moved relative to the display via the hinge. When the portable electronic device is in a tablet mode, the host is located in the receiving groove, and substantially parallel to the display, and the input surface faces the display.

In some embodiments, when the portable electronic device is in an input module, the display is inclined relative to the host, and an angle between the display and the host is greater than 90 degrees.

In some embodiments, the host includes an input surface and a host-rear surface opposite to the input surface. When the portable electronic device is in a watching module, the display is inclined relative to the host, and the input surface of the host faces the display. When the portable electronic device is in a tablet mode, the input surface faces the display.

In some embodiments, the hinge is at an end of the sliding track when the portable electronic device is in a tablet mode. The hinge is located at another end of the sliding track when the portable electronic device is in an input module.

In conclusion, the portable electronic device of the present disclosure utilizes the sliding track and the hinge to ensure the host can be moved or rotated relative to the display. Moreover, the portable electronic device can be changed to various operation modules by adjusting the relative positions and angles between the host and the display.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

The spatially relative terms, such as upper and lower, may be used herein for ease of description to describe one element or feature's relationship to another element or feature as illustrated in the figures. The spatially relative terms are intended to encompass different orientations of the device in use or operation in addition to the orientation depicted in the figures. The shape, size, and thickness in the drawings may not be drawn to scale or simplified for clarity of discussion; rather, these drawings are merely intended for illustration.

The present disclosure provides a portable electronic device. The portable electronic device can be changed in various operation modules. In some embodiments, the portable electronic device can be changed in an operation module, a watching module, and a tablet mode by rotating and moving the display relative to the host in order to facilitate user operations in different ways.

Figure 1:
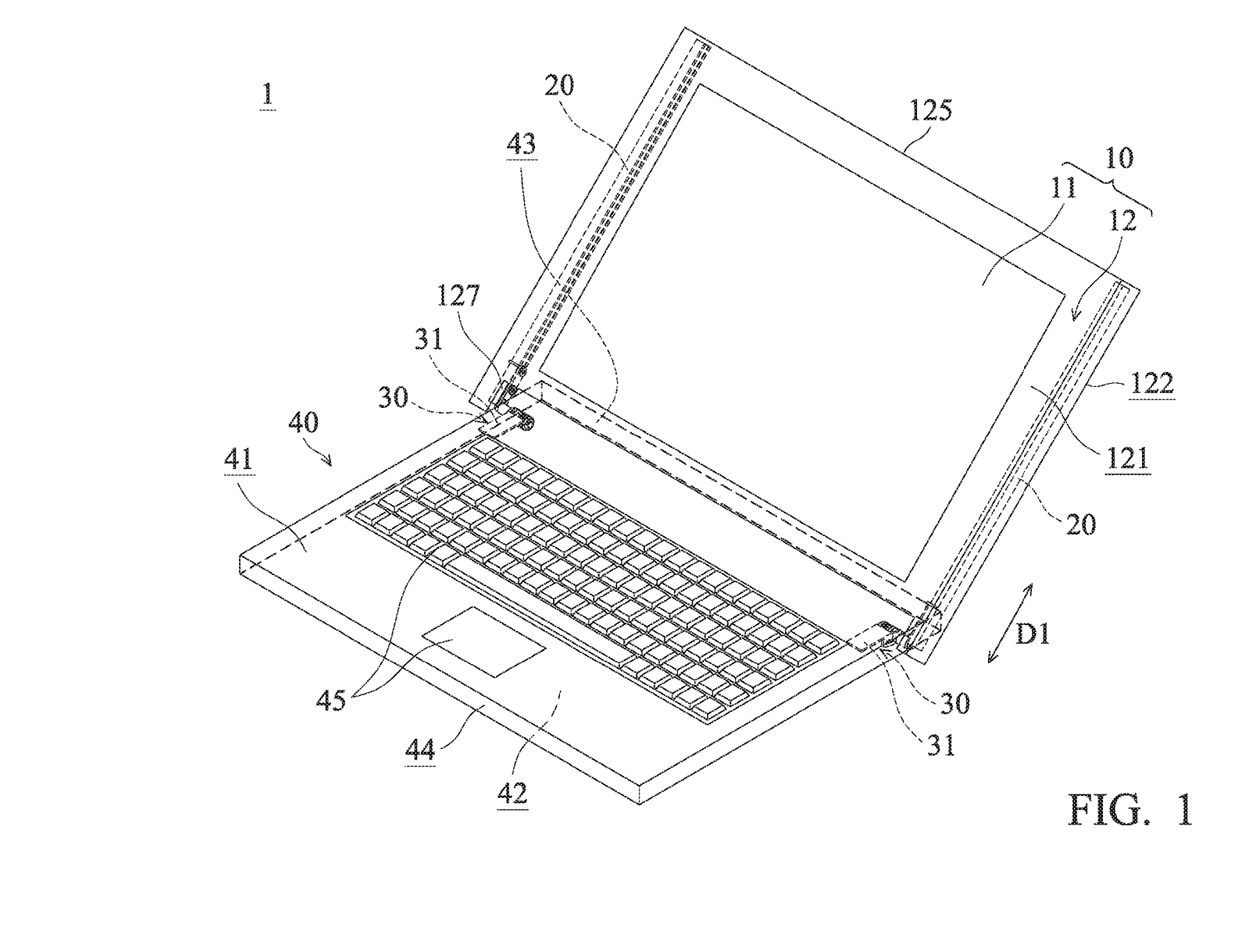
FIG. 1 is a perspective view of a portable electronic device in an operation module in accordance with some embodiments of the disclosure.
Figure 2:
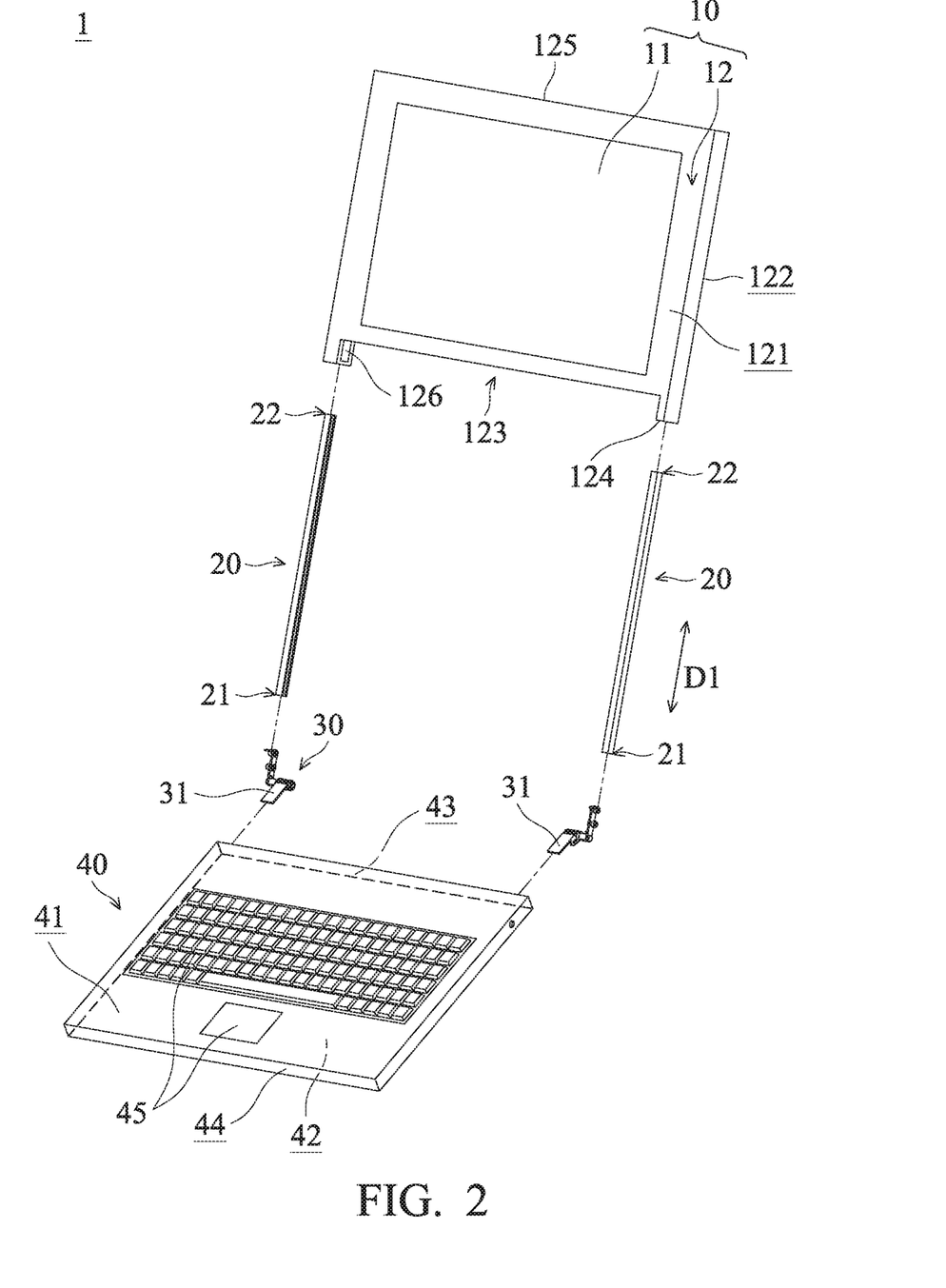
FIG. 2 is an exploded view of the portable electronic device in the operation module in accordance with some embodiments of the disclosure.
Figure 3:
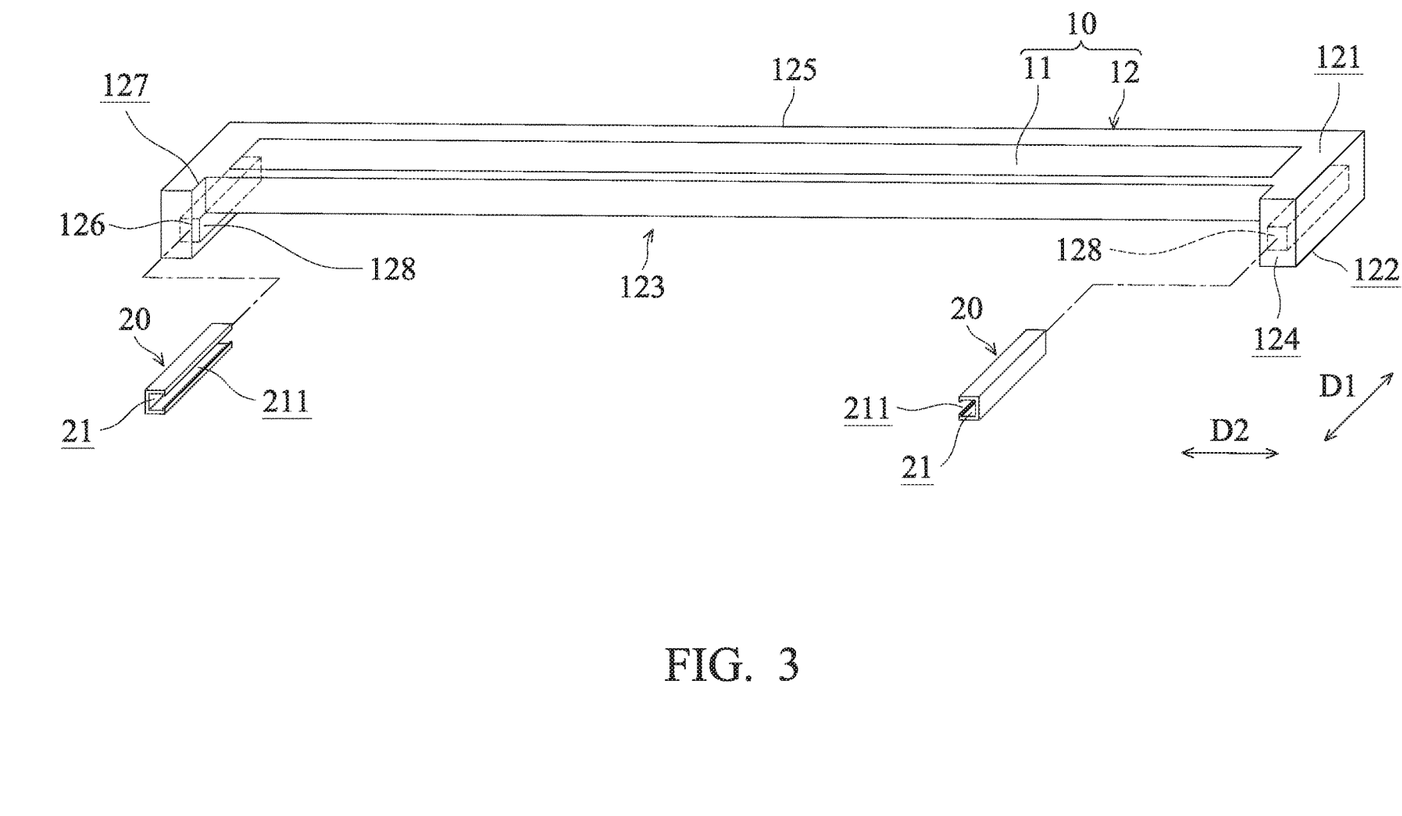
FIG. 3 is an exploded view of a display and a sliding track in accordance with some embodiments of the disclosure.
Figure 4:
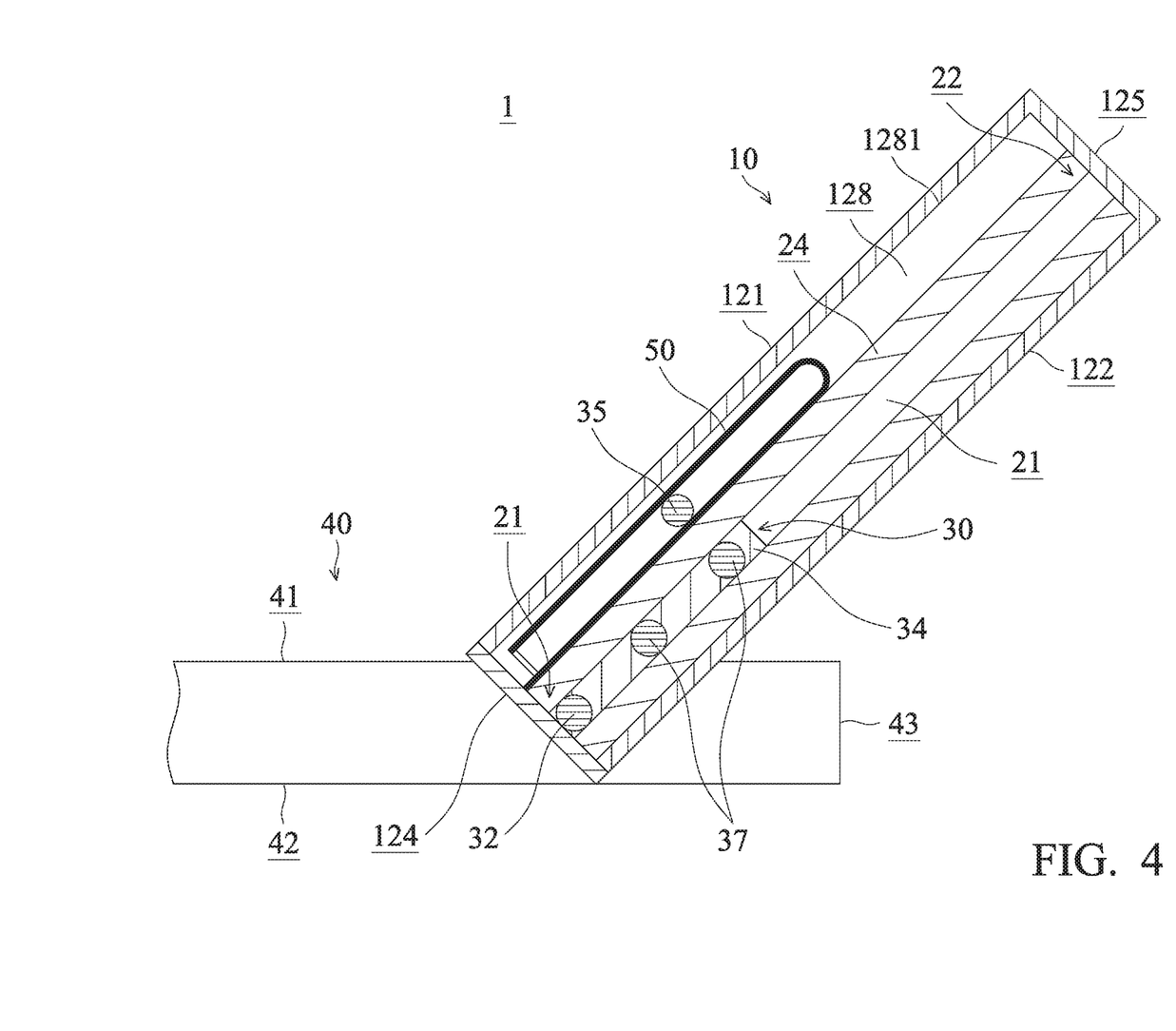
FIG. 4 is a schematic cross-sectional view of the portable electronic device 1 in the operation module in accordance with some embodiments of the disclosure.

FIG. 1 is a perspective view of a portable electronic device 1 in an operation module in accordance with some embodiments of the disclosure. FIG. 2 is an exploded view of the portable electronic device 1 in the operation module in accordance with some embodiments of the disclosure. FIG. 3 is an exploded view of a display 10 and a sliding track 20 in accordance with some embodiments of the disclosure. FIG. 4 is a schematic cross-sectional view of the portable electronic device 1 in the operation module in accordance with some embodiments of the disclosure.

The portable electronic device 1 can be a laptop computer. The portable electronic device 1 includes a display 10, two sliding tracks 20, tow hinges 30, and a host 40. The display 10 is a plate structure configured to display images. In some embodiments, the display 10 is a touch display.

The display 10 includes a display panel 11 and a frame 12. The display panel 11 is configured to display images. In some embodiments, the display panel 11 is a touch display panel. The display panel 11 is disposed in the frame 12.

The frame 12 of the display 10 has a display surface 121, a display-rear surface 122, and a receiving groove 123. The display panel 11 is located at the display surface 121 of the frame 12. The display-rear surface 122 is opposite to the display surface 121. In some embodiments, the display-rear surface 122 is parallel to or substantially parallel to the display surface 121. The receiving groove 123 forms on the display-rear surface 122. The receiving groove 123 is configured to receive the host 40.

The size of the receiving groove 123 corresponds to the size of the host 40. In some embodiments, the length of the receiving groove 123 is substantially equal to or slightly greater than the length of the host 40. The width of the receiving groove 123 is substantially equal to or slightly greater than the width of the host 40. The depth of the receiving groove 123 is substantially equal to or slightly greater than the thickness of the host 40.

The frame 12 further has a first side surface 124, a second side surface 125, a first opening 126, and a second opening 127. The first side surface 124 is connected to the display surface 121 and the display-rear surface 122. The second side surface 125 is opposite to the first side surface 124, and connected to the display surface 121 and the display-rear surface 122. The first opening 126 is located at the first side surface 124, and communicates with the receiving groove 123. The second opening 127 is located at the display surface 121 adjacent to the edge of the first side surface 124, and communicates with the receiving groove 123.

The frame 12 also has two sliding-track grooves 128 respectively formed on two opposite walls of the receiving groove 123. In other words, one sliding-track groove 128 faces the other sliding-track groove 128. The sliding-track grooves 128 extend along a movement direction D1. In this embodiment, the movement direction D1 is defined as a direction parallel to or substantially parallel to the display surface 121 or the display-rear surface 122. Moreover, the movement direction D1 is perpendicular to or substantially perpendicular to the first side surface 124 or the second side surface 125.

The sliding track 20 is disposed on display 10, and faces the receiving groove 123. In this embodiment, the sliding tracks 20 are respectively disposed in the sliding-track grooves 128, and extend along the movement direction D1. The width of the sliding track 20 is shorter than the width of the sliding-track groove 128. The widths of the sliding track 20 and the sliding-track groove 128 are measured in a direction perpendicular to the movement direction D1.

The sliding track 20 is a C-shaped structure. In the other words, a cross section of the sliding track 20 perpendicular to the movement direction D1 is a C shape. In this embodiment, the sliding track 20 has sliding groove 21 extending along the movement direction D1 and communicating with the receiving groove 123. The sliding groove 21 has an elongated opening 211. The elongated opening 211 extends along the movement direction D1, and the width of the elongated opening 211 is shorter than the greatest width of the sliding groove 21. The width of the elongated opening 211 and the greatest width of the sliding groove 21 are measured in the same direction, perpendicular to the movement direction D1.

The hinge 30 is movably disposed on the sliding track 20, and located in the receiving groove 123 of the display 10. Moreover, the hinge 30 is fixed in a first edge 43 of the host 40. The hinge 30 is configured to provide a torque between the display 10 and the host 40 to maintain the relative angle between the display 10 and the host 40. In this embodiment, the hinge 30 is moved along the sliding track 20 and the movement direction D1. Since the hinge 30 is fixed on the host 40, the host 40 is rotated and moved relative to the display 10 via the hinge 30.

The host 40 is a plate structure, and can be a computer host. The host 40 includes various electric elements, such as CPU, memory, and mother board (not shown in figures). The host 40 further has an input surface 41, a host-rear surface 42 opposite to input surface 41, and a second edge 44 opposite to first edge 43. The first edge 43 is parallel to or substantially parallel to the second edge 44. The first edge 43 is connected to the input surface 41 and the host-rear surface 42. The second edge 44 is connected to the input surface 41 and the host-rear surface 42. The host 40 also includes input modules 45 disposed on input surface 41. The input module 45 can be a keyboard, a touch panel and/or a touch display.

Figure 5:
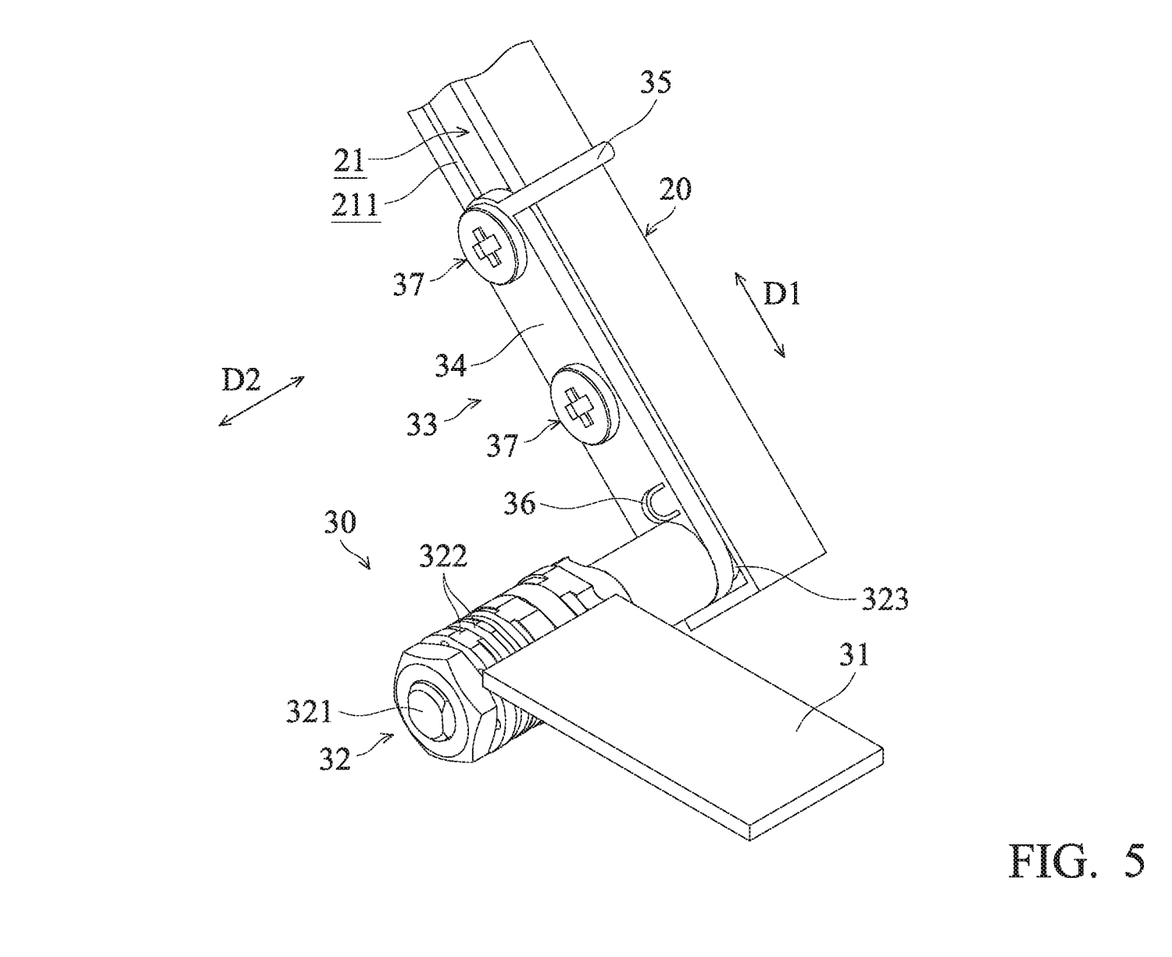
FIG. 5 is a perspective view of the hinge and the sliding track in accordance with some embodiments of the disclosure.
Figure 6:
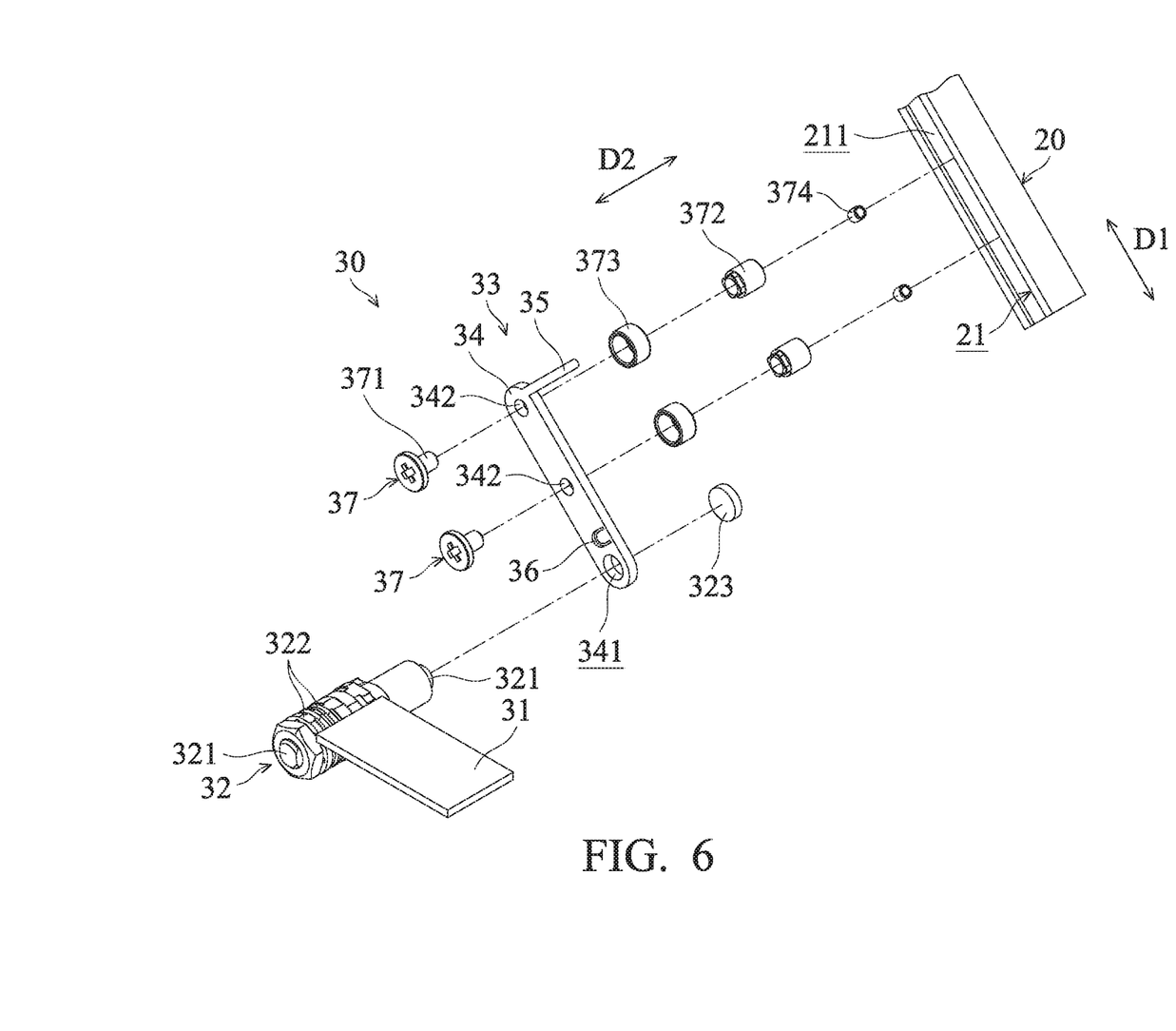
FIG. 6 is an exploded view of the hinge and the sliding track in accordance with some embodiments of the disclosure.

FIG. 5 is a perspective view of the hinge 30 and the sliding track 20 in accordance with some embodiments of the disclosure. FIG. 6 is an exploded view of the hinge 30 and the sliding track 20 in accordance with some embodiments of the disclosure. As shown in FIG. 5 and FIG. 6, the hinge 30 includes a fixing element 31, a torque assembly 32, and a sliding mechanism 33. The fixing element 31 is fixed in the host 40 (as shown in FIG. 1 and FIG. 2). The fixing element 31 is a sheet structure.

The torque assembly 32 is configured to provide a torque between the display 10 and the host 40 to maintain the relative angle between the display 10 and the host 40. The torque assembly 32 is disposed on a side of the fixing element 31. In some embodiments, the fixing element 31 pivots on the torque assembly 32.

In this embodiment, the torque assembly 32 includes a shaft 321, torque elements 322, and a blocking element 323. The shaft 321 extends along an axis direction D2. The shaft 321 passes through the fixing element 31 and the torque element 322. The blocking element 323 is disposed on an end of the shaft 321. In other words, the fixing element 31, the torque element 322, the blocking element 323 are disposed on the shaft 321, and arranged in the axis direction D2.

The sliding mechanism 33 pivots on the torque assembly 32, and movably disposed on the sliding track 20. As shown in FIG. 5 and FIG. 6, the sliding mechanism 33 is movably disposed in the sliding groove 21. In this embodiment, the sliding mechanism 33 includes a sliding element 34, a wire-trimming rod 35, a limitation element 36, and two wheels 37.

The sliding element 34 pivots on the torque assembly 32, and in contacts with the sliding track 20. The sliding element 34 may be a plate structure extending along the movement direction D1. In this embodiment, the sliding element 34 covers the elongated opening 211 of the sliding groove 21, and can be moved along the movement direction D1.

As shown in FIG. 5 and FIG. 6, the shaft 321 passes through a hole 341 of the sliding element 34, and the sliding element 34 is located between the torque element 322 and the blocking element 323. In other words, the sliding element 34 is rotated about the shaft 321, and the torque element 322 provides a torque between the sliding element 34 and the torque assembly 32.

Since the width of the blocking element 323 is longer than the diameter of the hole 341, the blocking element 323 can be used to prevent the shaft 321 from separating from the sliding element 34. The width of the blocking element 323 and the diameter of the hole 341 are measured in the movement direction D1.

The wire-trimming rod 35 is disposed on the sliding element 34, and extends along the axis direction D2, which is perpendicular to or substantially perpendicular to the movement direction D1. The wire-trimming rod 35 is located at a side of the sliding track 20. The limitation element 36 is disposed on sliding element 34. As shown in FIG. 5 and FIG. 6, the limitation element 36 can be a ring-like structure, and two ends of the limitation element 36 are respectively fixed on the sliding element 34.

The wheels 37 are rotatably disposed on the sliding element 34, and located in the sliding groove 21. Each of the wheels 37 respectively passes through the holes 342 of the sliding element 34. Since the wheels 37 are arranged in the movement direction D1, and the holes 342 are arranged along the movement direction D1, the extension of the sliding element 34 is maintained in a direction parallel to or substantially parallel to the movement direction D1.

In this embodiment, each of the wheels 37 includes an axis shaft 371, a bearing 372, a main wheel 373, and a side wheel 374. The axis shaft 371 extends along the axis direction D2, and passes through the hole 342 of the sliding element 34. An end of the axis shaft 371, the bearing 372, the main wheel 373, and the side wheel 374 is located in the sliding groove 21. The bearing 372 extends along the axis direction D2, and is disposed on the axis shaft 371.

The main wheel 373 extends along the axis direction D2, and the main wheel 373 is rotatably disposed on the bearing 372. The main wheel 373 is in contact with a side wall of the sliding groove 21, which is perpendicular to or substantially perpendicular to the elongated opening 211. The side wheel 374 pivots on the bearing 372, and the side wheel 374 extends perpendicular to the axis direction D2 and the movement direction D1. The side wheel 374 may be in contact with the side wall of the sliding groove 21, which faces the elongated opening 211. The sliding mechanism 33 of the hinge 30 is smoothly moved in the sliding groove 21 by the main wheel 373 and/or the side wheel 374.

As shown in FIG. 1 and FIG. 5, the portable electronic device 1 is in the input module. The hinge 30 is moved to an end 22 of the sliding track 20 along the movement direction D1 to make the first edge 43 of the host 40 and the hinge 30 close to the first side surface 124 of the display 10. Moreover, the display 10 is inclined relative to the host 40 by rotating the display 10 or the host 40. In some embodiments, the angle between the display 10 and the host 40 is greater than 90 degrees. In the input module, the first edge 43 of the host 40 is located in the first opening 126 and the second opening 127.

As shown in FIG. 4, in this embodiment, the portable electronic device 1 further includes a signal wire 50 electrically connected to the display 10 and the host 40. The signal wire 50 is located in the sliding-track groove 128.

As shown in FIG. 4, the signal wire 50 is located between an outer surface 24 of the sliding track 20 and a top surface 1281 of the sliding-track groove 128. The signal wire 50 is bent between the outer surface 24 and the top surface 1281. The wire-trimming rod 35 is located between two sections of the bended signal wire 50. In some embodiments, an end of the signal wire 50 may be in contact with and fixed on the outer surface 24 of the sliding track 20, which is adjacent to the end 22. The other end of the signal wire 50 is disposed on the limitation element 36 (as shown in FIG. 5), and is fixed on the sliding element 34 via the limitation element 36. Therefore, when the hinge 30 is moved along the movement direction D1, the signal wire 50 is electrically connected to the display 10 and the host 40 well.

Figure 7:
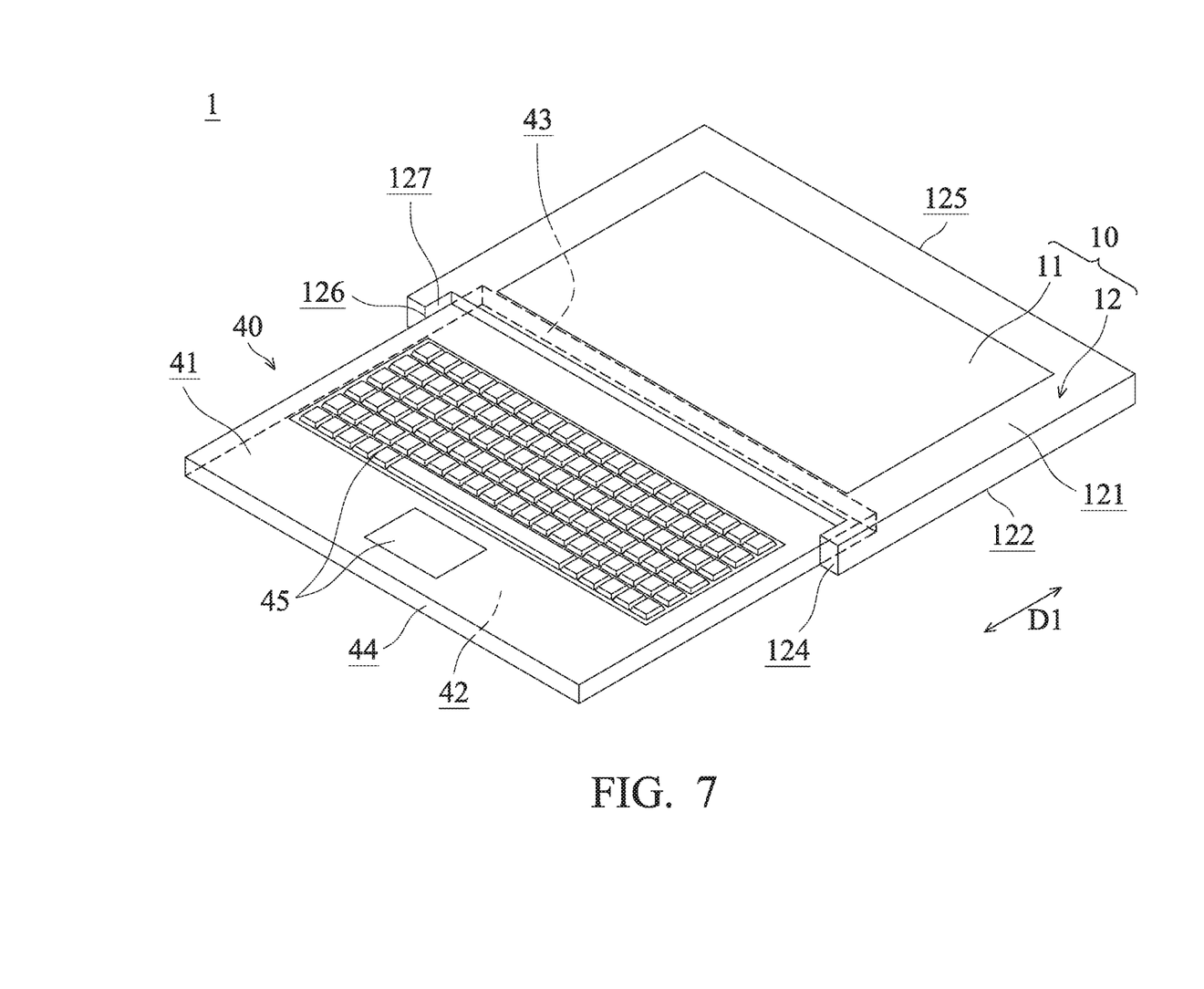
FIG. 7 is a perspective view of the portable electronic device during a transforming process in accordance with some embodiments of the disclosure.

FIG. 7 is a perspective view of the portable electronic device 1 during a transforming process in accordance with some embodiments of the disclosure. When the user starts to change the portable electronic device 1 from the input module to the tablet mode or the watching module, the display 10 can be rotated relative to the host 40 first, to make it so the display 10 and the host 40 are located on a plane. Afterward, the host 40 is moved toward the second side surface 125 of the display 10 along the movement direction D1.

Figure 8A:
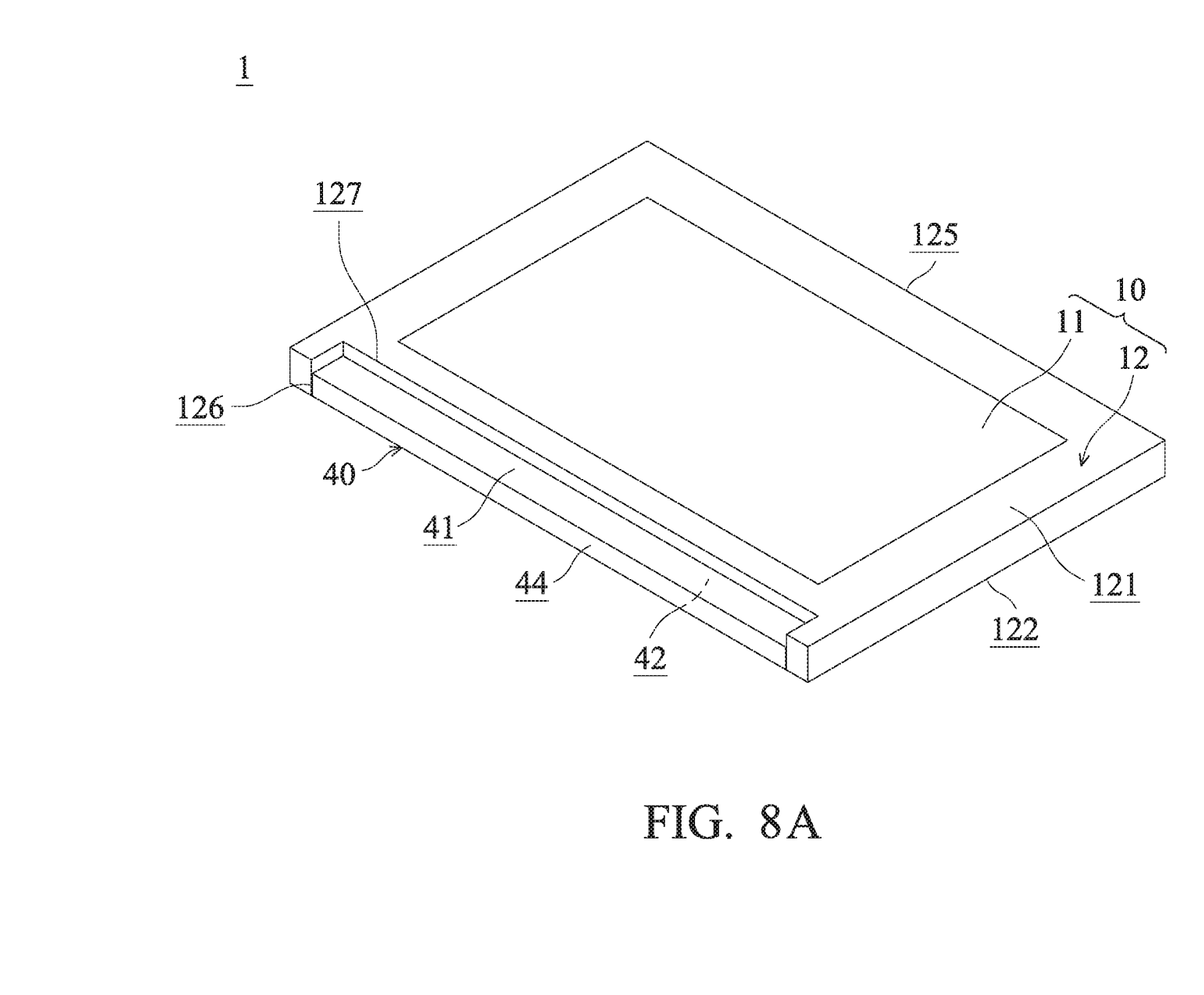
FIG. 8A and FIG. 8B is a perspective view of the portable electronic device 1 in the tablet mode in accordance with some embodiments of the disclosure.
Figure 8B:
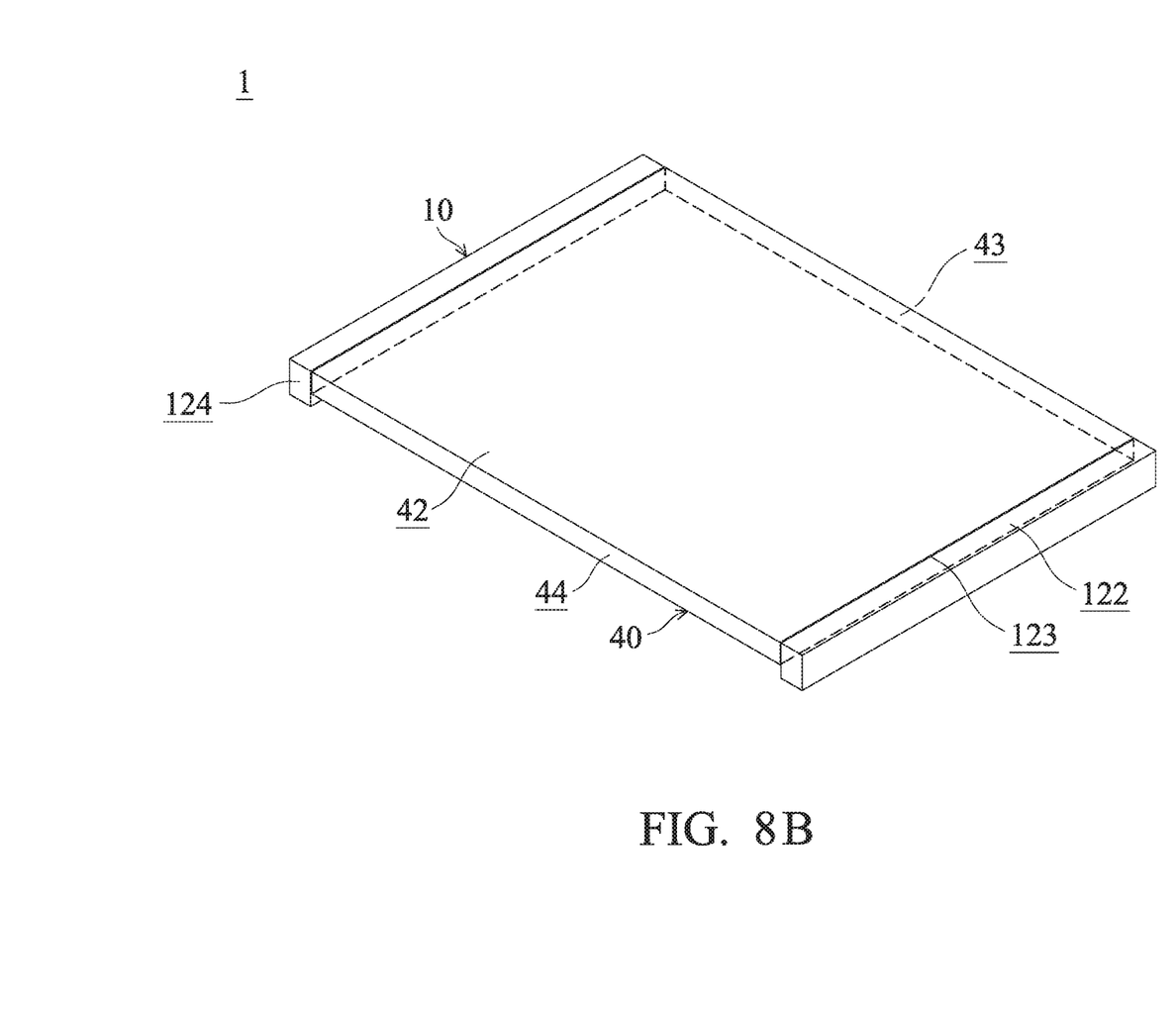
Figure 9:
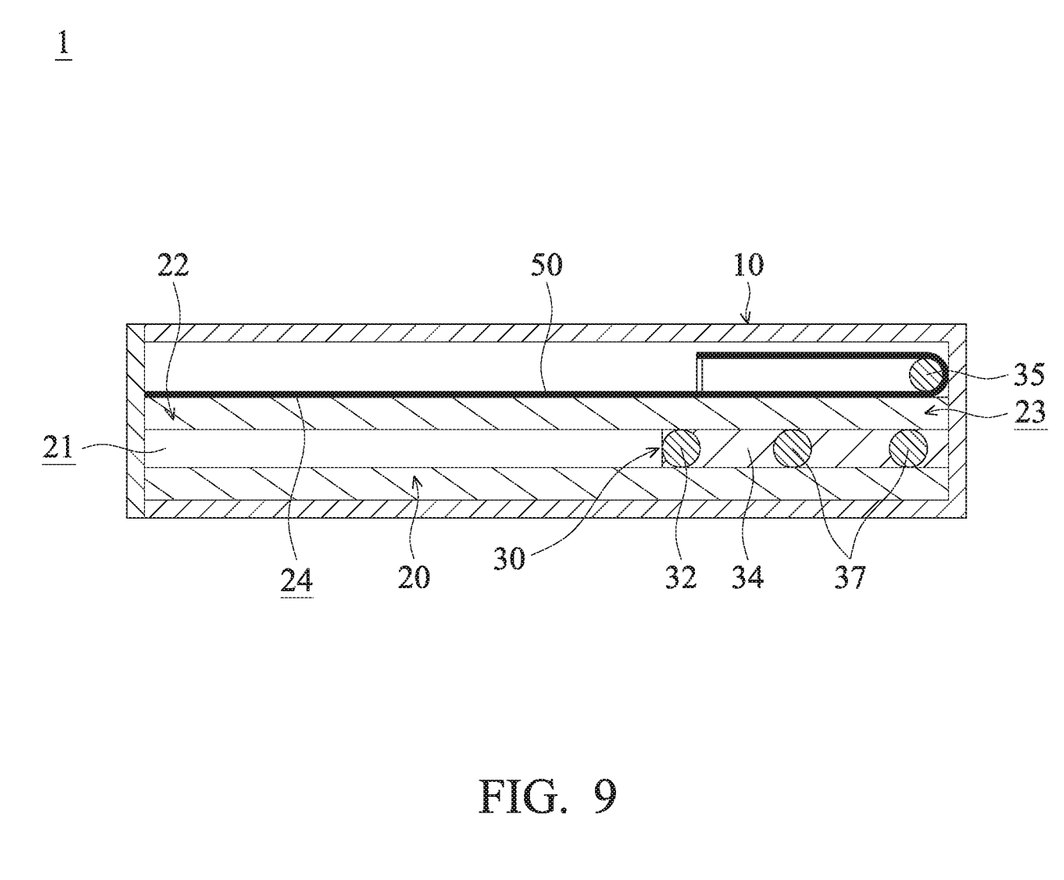
FIG. 9 is a schematic cross-sectional view of the portable electronic device in the tablet mode in accordance with some embodiments of the disclosure.

FIG. 8A and FIG. 8B is a perspective view of the portable electronic device 1 in the tablet mode in accordance with some embodiments of the disclosure. FIG. 9 is a schematic cross-sectional view of the portable electronic device 1 in the tablet mode in accordance with some embodiments of the disclosure. When the portable electronic device 1 is in the tablet mode, the host 40 is located in the receiving groove 123, and substantially parallel to the display 10. In some embodiments, the host 40 is completely located in the receiving groove 123. In some embodiments, at least 70%, 80% or 90% volume of the host 40 is located in the receiving groove 123.

The first edge 43 of the host 40 is adjacent to the second side surface 125 of the display 10. The second edge 44 of the host 40 is adjacent to the first side surface 124 of the display 10.

Since the input surface 41 of the host 40 faces the display 10, the operation of the portable electronic device 1 will not be interfered with by accidentally touching the input module 45 when the portable electronic device 1 is in the tablet mode.

Moreover, as shown in FIG. 9, the hinge 30 is moved to an end 23 of the sliding track 20. Since the signal wire 50 is fixed on the hinge 30, the signal wire 50 is gradually unfolded to cover the outer surface 24. Moreover, when the hinge 30 is moved to an end 23 of the sliding track 20, the wire-trimming rod 35 provides a pull force to make the signal wire 50 in the sliding-track groove 128 smooth because the signal wire 50 may clad and abut against the wire-trimming rod 35. Therefore, the hinge 30 can be smoothly moved to the other end 22 of the sliding track 20 again.

When the user starts to change the portable electronic device 1 from the tablet mode to the input module, the host 40 can be pulled out from the display 10, and the display 10 is rotated to be inclined related to the host 40. Therefore, the portable electronic device 1 can be easily changed from the tablet mode to the input module.

Figure 10:
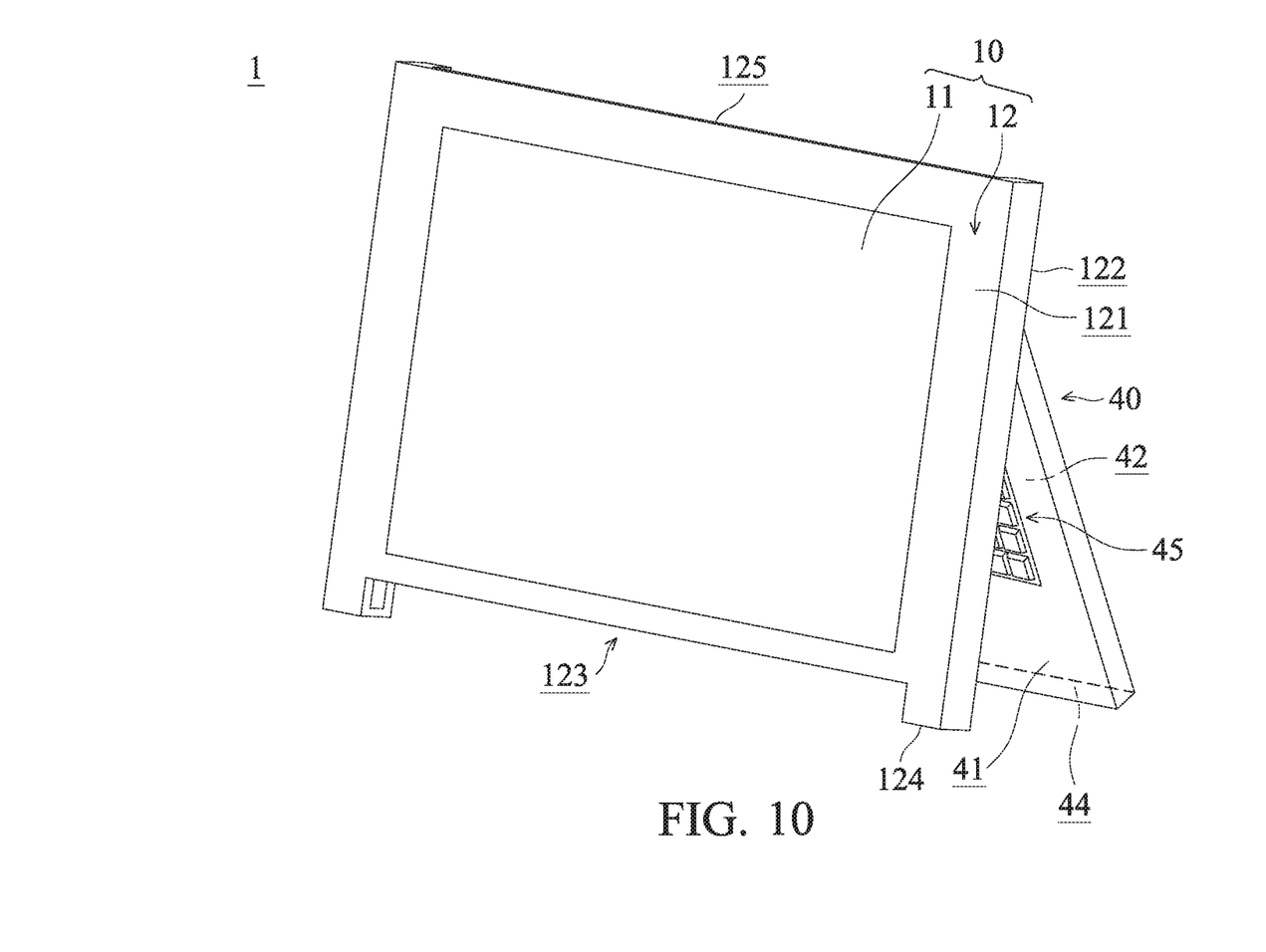
FIG. 10 is a schematic view of the portable electronic device in the watching module in accordance with some embodiments of the disclosure.

FIG. 10 is a schematic view of the portable electronic device 1 in the watching module in accordance with some embodiments of the disclosure. The portable electronic device 1 can be easily changed to the watching module by rotating and turning out the host 40 in the tablet mode relative to the display 10 to make an acute angle between the display 10 and the host 40. In the watching module, the display 10 is inclined relative to the host 40, and the input surface 41 of the host 40 faces the display 10. Therefore, the portable electronic device 1 can be stood on a plane (such as a tabletop), and the images or pictures displayed by the display 10 is convenient for watching.

When the user starts to change the portable electronic device 1 from the watching module to the tablet mode, the host 40 can be rotated to make sure that the host 40 is received in the receiving groove 123. Therefore, the portable electronic device 1 is easily changed from the watching module to the tablet mode.

In conclusion, the portable electronic device of the present disclosure utilizes the sliding track and the hinge to ensure the host can be moved or rotated relative to the display. Moreover, the portable electronic device can be changed to various operation modules by adjusting the relative positions and angles between the host and the display.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
   a display comprising a display surface, a display-rear surface opposite to the display surface, and a receiving groove formed on the display-rear surface;
   a sliding track, disposed on the display, facing the receiving groove;
   a hinge, moveably disposed on the sliding track, located in the receiving groove, wherein the hinge comprises:
   a fixing element fixed on the host;
   a torque assembly disposed on the fixing element; and
   a sliding mechanism, pivoting on the torque assembly, and movably disposed on the sliding track; and
   a host disposed on the hinge,
   wherein the host is rotated and moved relative to the display via the hinge, and when the portable electronic device is in a tablet mode, the host is located in the receiving groove, and substantially parallel to the display.

2. The portable electronic device as claimed in claim 1, wherein when the portable electronic device is in an input module, the display is inclined relative to the host, and an angle between the display and the host is greater than 90degrees.

3. The portable electronic device as claimed in claim 1, wherein the host comprises an input surface and a host-rear surface opposite to the input surface, and when the portable electronic device is in a watching module, the display is inclined relative to the host, and the input surface of the host faces the display.

4. The portable electronic device as claimed in claim 1, wherein the host comprises an input surface and a host-rear surface opposite to the input surface, and when the portable electronic device is in a tablet mode, the input surface faces the display.

5. The portable electronic device as claimed in claim 1, wherein the hinge is at an end of the sliding track when the portable electronic device is in a tablet mode, and the hinge is located at another end of the sliding track when the portable electronic device is in an input module.

6. The portable electronic device as claimed in claim 1, wherein the sliding track comprises sliding groove extending along a movement direction and communicating with the receiving groove, wherein the sliding mechanism is movably disposed in the sliding groove.

7. The portable electronic device as claimed in claim 6, wherein the sliding mechanism comprises:
   a sliding element, pivoting on the torque assembly, in contact with the sliding track; and
   a wheel, rotatably disposed on the sliding element, located in the sliding groove.

8. The portable electronic device as claimed in claim 7, further comprising a signal wire electrically connected to the display and the host, wherein the sliding mechanism further comprises a wire-trimming rod extending along a direction substantially perpendicular to the movement direction, the signal wire is located at an outer surface of the sliding track, and the wire-trimming rod is located between two sections of the signal wire.

9. The portable electronic device as claimed in claim 8, wherein the sliding mechanism further comprises a limitation element disposed on the sliding element and configured to retain the signal wire to the sliding element.

* * * * *